United States Patent [19]

Bateman et al.

[11] 3,944,968
[45] Mar. 16, 1976

[54] AIRCRAFT GROUND PROXIMITY WARNING SYSTEM HAVING SPEED VERSUS ALTITUDE COMPENSATION

[75] Inventors: Charles D. Bateman, Bellevue; Hans Rudolf Muller, Kirkland, both of Wash.

[73] Assignee: Sundstrand Data Control, Inc., Redmond, Wash.

[22] Filed: Nov. 1, 1974

[21] Appl. No.: 520,138

[52] U.S. Cl. ........ 340/27 AT; 73/178 R; 235/150.2; 244/77 D; 343/7 TA; 343/112 CA; 343/112 S
[51] Int. Cl.² .............................................. G01C 5/00
[58] Field of Search ........ 35/10.2; 73/178 R, 178 T; 235/150.2, 150.22; 244/77 A, 77 D; 340/27; 343/7 TA, 112 A, 112 CA, 112 S

[56] References Cited
UNITED STATES PATENTS

| | | | |
|---|---|---|---|
| 2,736,878 | 2/1956 | Boyle, Jr. | 340/27 R |
| 3,077,557 | 2/1963 | Joline et al. | 340/27 X |
| 3,245,076 | 4/1966 | LeTilly et al. | 343/7 TA |
| 3,333,795 | 8/1967 | Hattendorf et al. | 235/150.22 X |
| 3,510,090 | 5/1970 | Falkner et al. | 244/77 D |
| 3,641,323 | 2/1972 | Hughes et al. | 235/150.22 X |
| 3,698,669 | 10/1972 | Miller | 244/77 A |
| 3,715,718 | 2/1973 | Astengo | 340/27 R |
| 3,774,017 | 11/1973 | Zagalsky | 235/150.2 |

*Primary Examiner*—Trygve M. Blix
*Assistant Examiner*—Stephen G. Kunin
*Attorney, Agent, or Firm*—Ted E. Killingsworth; Michael B. McMurry

[57] ABSTRACT

The warning system includes a function generator for generating a signal representative of a minimum altitude over terrain as a function of the aircraft's speed. This signal is combined with a signal representing the aircraft's actual altitude over the terrain and if the aircraft is below this minimum altitude a warning signal is generated. A circuit is included to inhibit the warning signal, and thereby nuisance warnings, when the aircraft overflys another aircraft. In addition, electronic circuitry is disclosed for implementing the invention that is compatible with at least two separate types of air data computers.

29 Claims, 3 Drawing Figures

AIRCRAFT GROUND PROXIMITY WARNING SYSTEM HAVING SPEED VERSUS ALTITUDE COMPENSATION

BACKGROUND OF THE INVENTION

This invention relates to aircraft ground proximity warning systems and more particularly to ground proximity warning systems that utilize speed versus altitude relationships to generate warning signals indicating unsafe flight profiles.

In the prior art warning systems, as represented by Astengo U.S. Pat. No. 3,715,718 and the applications of Bateman Ser. No. 480,727 and a subsequent application by Bateman entitled "Aircraft Landing Approach Ground Proximity Warning System," Ser. No. 511,757 filed on Oct. 3, 1974 all assigned to the assignee of the present invention, there is no direct relationship between the speed of aircraft and the altitude at which a warning is generated. In the application of Bateman entitled "Aircraft Ground Proximity Warning System with Speed Compensation," Ser. No. 511,674 filed on Oct. 3, 1974 also assigned to same assignee as this invention, an apparatus is disclosed for increasing the warning time as a function of the aircraft speed. However, this system utilizes the rate of change of the aircraft's altitude and does not make use of a measure of the aircraft's actual altitude above ground as a primary criteria for providing a warning.

Normally, an aircraft proceeding at a relatively high rate of speed is considered not to require a terrain warning system since it is assumed that the aircraft is at a normal operating altitude where the chances of impacting the terrain are fairly remote. However, there are a number of circumstances where this assumption may not hold true, such as an aircraft assuming an incorrect attitude through pilot error, e.g. flying toward the ground when it should be in level flight or climbing. Another example may occur where an aircraft is flying through mountainous territory or is beginning a landing approach to an airfield that is surrounded by high hills or mountains. While it is considered desirable to provide the crew of aircraft with warnings of the close proximity of the ground during relatively high speed operation, at the same time, it is important to keep the number of nuisance warnings at a minimum. A nuisance warning is defined as a warning that is generated when the crew of aircraft is aware of all relevant factors and is ordinarly not obligated to take special action to avoid impacting the terrain. It is therefore important that a warning system discriminate, insofar as possible, between conditions indicating unsafe flight and normal flight conditions.

SUMMARY OF THE INVENTION

It is accordingly an object of the invention to provide an aircraft ground proximity warning system that generates warnings based on the relative speed of aircraft as considered in light of the aircraft's altitude above the terrain.

It is a further object of the invention to provide a warning system that will generate a signal representative of the minimum safe altitude above the terrain as a function of the speed of the aircraft.

It is an additional object of the invention to provide a terrain clearance warning system that minimizes nuisance warnings.

It is still another object of the invention to provide a terrain warning system having electronic circuitry that is plug-in compatible with a plurality of air data computers.

This system utilizes as one of its primary inputs a measure of the aircraft's forward speed. This measure can be air speed, ground speed or the Mach number of the aircraft. Using the Mach number as an example, a function generator generates a signal that is proportional to the Mach number of the aircraft and in turn represents the minimum terrain clearance or altitude for the aircraft for each particular speed or Mach number. This is essentially a linear relationship where the minimum terrain clearance increases with the speed of the aircraft. For instance, for speeds of 166 nautical miles per hour or below the generator will generate a signal indicating that 500 feet is the minimum safe altitude above ground and this signal will increase linearly until at a speed of, for example, 300 miles per hour the minimum computed safe altitude will be 2400 feet.

This signal is combined with a signal generated by the aircraft's radar altimeter, which measures the aircraft's actual altitude above ground, and whenever the signal representing the minimum computed safe altitude over the terrain exceeds the actual altitude over the terrain, a crew alarm is activated.

In addition, the warning system is deactivated by a signal that indicates that the aircraft is in a landing configuration so that the alarm will not be triggered as the aircraft approaches the runway.

In order to reduce the number of nuisance warnings, circuitry is provided to inhibit the warning signal under certain specified conditions. Such a condition might result from one aircraft overflying another, which can easily occur in an airport holding pattern. This type of situation is characterized by an extremely rapid change in the radar altimeter reading since the aircraft will normally be flying at an altitude sufficiently high that the radar altimeter will not register at all until it overflys the other aircraft. Many radar type altimeters do not register altitudes of greater than 2500 feet so that when one aircraft overflys another by one or two thousand feet there will be an extremely rapid rate of change in altitude indicated by the altimeter. Special inhibitor circuitry is provided to recognize this rapid change in altimeter readings and to inhibit the warning signal. The circuitry is then reset, i.e. the inhibition removed from the warning signal, when the altitude registered by the radar altimeter is greater than 2500 feet corresponding, for instance, to the point where the first aircraft has completed overflying the second aircraft and the radar altimeter is again registering its maximum reading.

BRIEF DESCRIPTIONS OF THE DRAWINGS

DETAILED DESCRIPTION OF THE INVENTION

Figure 1:
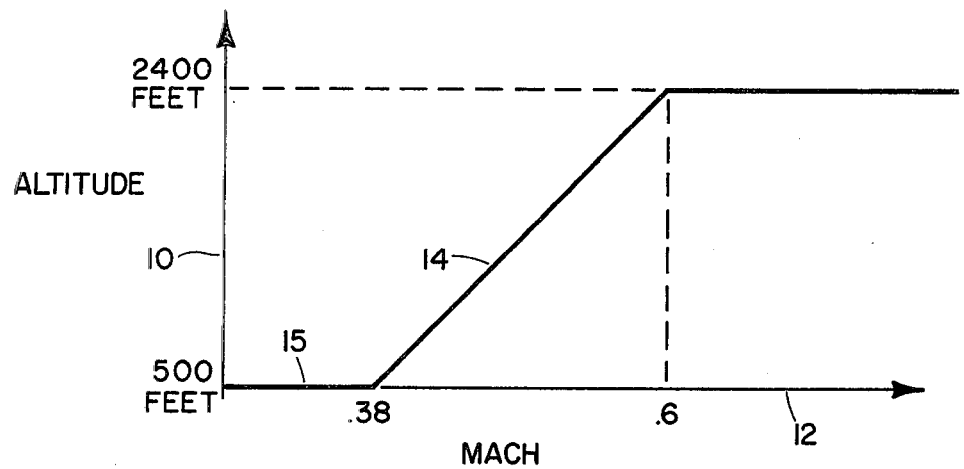
FIG. 1 is a graph illustrating the speed versus altitude characteristics of the warning system.

FIG. 1 of the drawings illustrates, in graphical form, the nature of the terrain clearance warning signal generated by the system for a commercial jet aircraft. For purposes of illustration, the vertical axis 10 which represents the altitude above ground or the terrain is calibrated in feet and the horizontal axis 12 which represents the forward speed of the aircraft is calibrated in Mach numbers. It will be understood, of course, that the forward speed of the aircraft could be represented in air speed or ground speed but for purposes of the preferred embodiment, Mach number is a more convenient form of measurement for implementing the preferred embodiment of the invention. The lines 14 and 15 represent the generally linear relationships between the speed of the aircraft and the altitude above ground and, as such, denotes the conditions under which the terrain warning will be generated. For example, when the aircraft is traveling at 0.38 Mach or less at an altitude of the 500 feet or below a warning signal will be generated as shown by line 15, and similarly at a speed of 0.38 Mach or greater a warning signal will be generated depending upon its altitude as indicated by line 14. Line 14 illustrates the general altitude versus speed characteristics of the warning system for aircraft speeds above a predefined minimum. In other words, the faster the aircraft is traveling above 0.38 Mach the greater the altitude above ground it must maintain in order to avoid triggering a warning signal. On the other hand, when the aircraft is in a landing configuration it is assumed that altitudes of below 500 feet are allowable in the normal operation of the aircraft so the warning signal will be inhibited. However, in normal flight configuration the general rule followed by the warning system is that the greater the speed of the aircraft, the greater its altitude should be above the terrain for safe operation.

Figure 2:
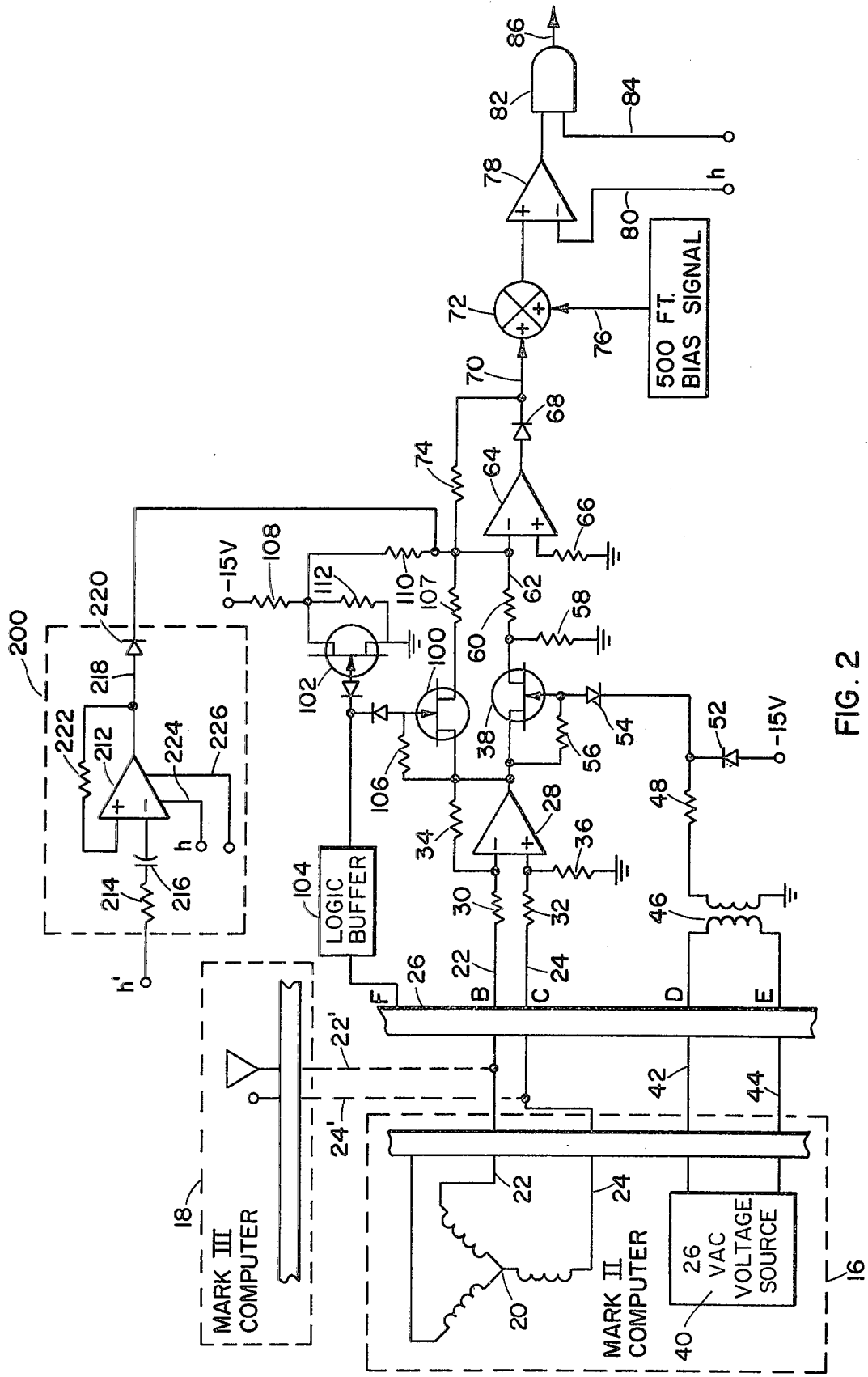
FIG. 2 is a schematic diagram of the circuitry to implement the warning system.

The preferred embodiment of the circuitry implementing the warning characteristics shown in FIG. 1 is illustrated in the schematic diagram presented in FIG. 2 of the drawings. Illustrated in FIG. 2 is circuitry that is specifically designed to interface with two different types of air data computers. The specifications for both types of computers are provided in publications of ARINC (Aeronautical Radio, Inc., 2551 Riva Road, Annapolis, Md., 21401). The specifications of the Mark II Sub-Sonic Air Data System are provided in the ARINC characteristic number 565 issued on Feb. 15, 1968, and the specifications of the Mark III Sub-Sonic Air Data System — Digital are provided in the ARINC characteristic number 575-3 issued on July 15, 1971. The primary function of the air data computer is to provide various inputs and signals representing aircraft performance parameters to the various avionics systems in an aircraft. The preferred embodiment of the invention, as illustrated in FIG. 2, has been specifically designed to interface in a simple "plug in" mode with both the Mark II and Mark III computers. Since the Arinc computer's specifications provide essentially an industry standard for signal parameters and circuit pin configurations, a system that interfaces directly with these specifications will provide a warning system of very broad industry acceptability.

One of the outputs of both data computers is a signal that represents the Mach number of the aircraft. There are two different types of Mach number signals depending on the type of air data computer. The Mark II computer, indicated by the dashed lines 16 in FIG. 2, generates a 400 Hz alternating current signal, whereas in the Mark III computer, indicated by the dashed lines 18, the Mach number of the aircraft is represented by a DC voltage. As indicated before, one of the objects of the preferred embodiment of the invention is to provide a circuit for generating a signal with the characteristics shown in FIG. 1 that may be plugged directly into either of these two types of computers.

The circuitry in FIG. 2 will first be discussed with reference to the type of Mach signal received from the Mark II type computer shown at 16 of FIG. 2. Here the Mach number of the aircraft is represented by a 400 Hz signal generated by the Mach synchro 20 which in turn is output through lines 22 and 24 to the pins B and C of the circuit board 26. The general characteristics of this signal are as follows: at a very low Mach number, approaching zero, the signal will have an amplitude of approximately 10 volts RMS wherein the signals on lines 22 and 24 will be 180 degrees out of phase; in relation to the 26 VAC excitation signal on lines 42 and 44, as the speed of the aircraft increases, the signal amplitude will decrease to approximately zero volts; and as the aircraft further increases speed, the signals on lines 22 and 24 will be in phase with the excitation voltage on lines 42 and 44 increasing to approximately 4 volts The 400 Hz signal on lines 22 and 24 is utilized as input to the buffer amplifier 28 through the resistors 30 and 32. The buffer amplifier includes a feedback resistor 34 and an attenuation resistor 36 connected from the positive terminal of the amplifier to ground. The output of the buffer amplifier 28 is in turn utilized as an input to the switching FET transistor 38. The transistor 38 is controlled by a 26 volt alternating current signal generated in the computer 16 by the voltage source 40. This signal is transmitted over lines 42 and 44 to the pins D and E of the circuit board 26 to an isolation transformer 46. The resulting signal is transmitted through resistor 48 and limited to minus 15 volt DC voltage which is applied to the line 50 through the diode 52. The diode 54 in cooperation with the output signal from the buffer amplifier 28 through the resistor 56 operates to turn the transistor 38 on and off in synchronism with the input to the isolation transformer 46. This results in a DC signal, as modified by resistors 58 and 60, on line 62 which is proportional to the Mach number of the aircraft.

The DC signal representing the Mach number on line 62 is utilized as input to the negative terminal of the bias amplifier 64. The positive terminal of the bias amplifier 64 is connected to a ground resistor 66. The output of the bias amplifier 64 is then transmitted through the diode 68 on line 70 to the summing junction 72. The output on line 70 from the bias amplifier 64 will be equivalent to the function shown by line 14 in FIG. 1; that is, the voltage on line 70 will increase in a linear relationship with the increasing Mach number of the aircraft.

In addition, there is a feedback loop to the negative terminal of the bias amplifier 64, containing the resistor 74, that has as its primary function to provide the correct gain factor of a signal on line 70 when the aircraft has achieved a speed of 0.38 Mach or greater.

At the summing junction 72, the signal on line 70 is combined with a biasing signal on line 76 which represents an altitude of 500 feet above the terrain. The output of the summing junction 72, at a speed of below 0.38 Mach, can be represented by the horizontal line 15 of FIG. 1. As the aircraft increases speed above 0.38 Mach the output of the biasing amplifier 64 will be added to the 500 foot signal on line 76 in the summing junction 72 thereby giving the response illustrated by line 14 of FIG. 1.

The output of the summing junction 72 is then applied to the positive terminal of the comparator 78. The negative terminal of the comparator 78 receives a signal $h$ from the radar altimeter that represents the aircraft's actual height above the terrain. The comparator serves to compare these two signals and when the computed minimum safe altitude above ground speed from the summing junction 78 exceeds the aircraft's actual altitude above ground, the comparator will generate a positive signal. This positive signal is then input to the AND gate 82.

The other input to the AND gate 82 is a signal on line 84 that represents the flight configuration of the aircraft. When the aircraft is in a landing configuration, which is denoted by the position of the aircraft's wheels and flaps, a low signal is placed on the line 84 thus shutting off the gate 82. This will have the effect of blocking the positive warning signal generated by the comparator 78 and thus preventing warnings when the aircraft descends below 500 feet to land. By the same token, when the aircraft returns to a normal flight configuration, i.e. wheels up and flaps up, which in a commercial jet is usually about 700 feet above the ground, a high signal will be generated on line 84 thereby having the effect of activating the warning system. If the aircraft should again descend below 500 feet in its flight configuration, the warning signal would be transmitted through gate 82 on line 86. To summarize, when the aircraft's actual altitude is below the computed minimum, the comparator 82 will generate a warning signal which can be used to trigger a visual or audible alarm system as taught in Astengo U.S. Pat. No. 3,715,718.

The circuitry just described works in essentially the same manner in conjunction with the Mark III type computers 18 of FIG. 2. For purposes of clarity, those elements of the circuit shown in FIG. 2 that relate to the operation of the signal generator as it utilizes the input of the Mark III computer 18 will be indicated by reference numerals beginning with 100. The output of the Mark III type air data computers 18 is represented by a DC voltage that ranges from zero to 12 volts as a direct function of the Mach number of the aircraft. As with the Mark II computer 16, these signals are input to the circuitry of FIG. 2 over lines 22' and 24' that correspond to pins B and C of the circuit board 26. The signal (0-12 volts DC) representing the Mach number of the aircraft is transmitted on line 22' to the negative terminal of the buffer amplifier 28. A floating ground voltage is similarly input to the positive terminal of the buffer amplifier 28 by means of line 24'. In order to modify the previously described circuitry to accept a DC input instead of the 400 Hz input of the Mark II computer, the 2 FET transistors 100 and 102 along with their associated circuitry are included in the circuit of FIG. 2. In the circuitry previously discussed that is associated with the Mark II computer 16, these two transistors, 100 and 102 are maintained in an "off" condition by a minus 15 biasing voltage generated by the logic buffer 104. The logic buffer 104 responds to a signal received through pin F of the circuit board 26 from the computer 16. However, when using the Mark III type computer 18, pin F is essentially connected to aircraft ground thereby eliminating the minus 15 biasing voltage from the gates of the transistors 100 and 102.

The function of the first transistor 100 is to modify the gain of the biasing amplifier 64 with respect to the Mach number signal received on line 22. The signal on line 22 is transmitted through resistors 30, 34 and 106 to the gate of the transistor 100. The output of the transistor 100 is then transmitted through resistor 107 to the negative terminal of the biasing amplifier 64 thereby serving to modify the gain of the biasing amplifier 64 so as to produce an output on line 70 that will be scaled in voltage to correspond to the altitude signal $h$ on line 76. The transistor 102 has as its primary function the reduction of the bias voltage applied to the negative terminal of the biasing amplifier 64. When the circuitry in FIG. 2 is being used in conjunction with the Mark II computer 16, a negative 15 volts is applied to the negative terminal of the biasing amplifier 64 through the resistors 108 and 110. Since the performance characteristics of the biasing amplifier 64 must be different for the Mark III computer 18, the transistor 102 is turned on which, in turn, serves to bypass the resistor 112. This has the net effect of decreasing the minus voltage applied to the negative terminal of the biasing amplifier 64.

It will be appreciated, therefore, that by merely plugging the circuitry disclosed in FIG. 2 into either the Mark II computer 16 or the Mark III computer 18, the circuit of FIG. 2 will automatically compensate for the two different types of input signal thereby permitting the use of this circuit with either computer without the need for modification.

Figure 3:
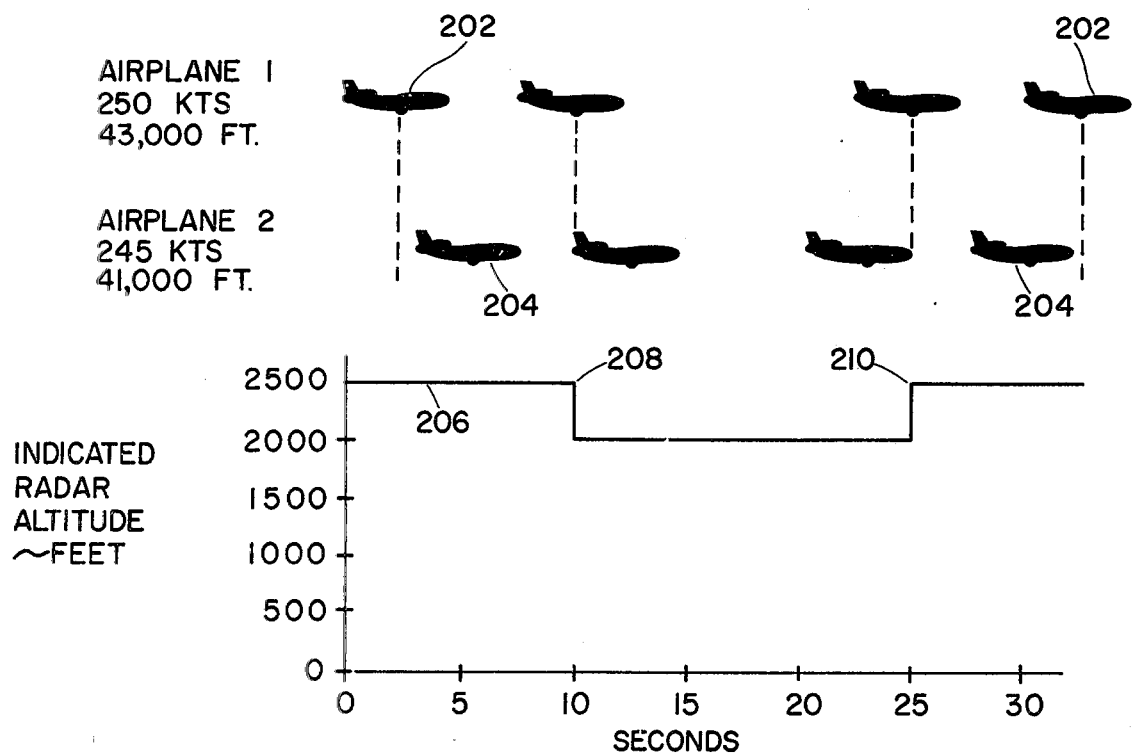
FIG. 3 is a graph illustrating the operation of the warning inhibit circuitry.

In order to reduce the instances of nuisance warnings, i.e. warnings generated by the system when there is no real danger to the aircraft, the inhibit circuit, shown within the dashed lines 200 of FIG. 2, has been included. An illustration of a set of circumstances where such an inhibiting function would be desirable is set forth in FIG. 3 of the drawings. As shown in FIG. 3, a false or nuisance warning can be generated by the circuitry of FIG. 2 when one aircraft overflys another in, for example, a holding pattern of an airport. Here the upper aircraft 202 is traveling at a relatively higher rate of speed and as it passes over the lower aircraft 204 the radar altimeter, because it is unable to distinguish between terrain and an aircraft, will give a reading of 2000 feet. This would have a tendency to trigger the terrain warning alarm. Just before the overflight the upper aircraft 202 will be receiving an indicated radar altitude of greater than 2,500 feet at 206. However, as soon as the upper aircraft 202 begins to overfly the lower aircraft, indicated at point 206, the indicated radar altitude will change as rapidly as the instrument will permit to indicate an altitude of 2000 feet. This reading continues at 2000 feet until the upper aircraft 202 completes the overflying of the lower aircraft at point 210 whereupon the indicated altitude will again register over 2500 feet. In order to prevent a nuisance warning under this or similar circumstances, the inhibit circuitry 200 of FIG. 2 is provided.

The primary input to the inhibit circuitry is $\dot{h}$ which represents the rate of change in altitude with respect to time. This signal can be generated by differentiating the radar altimeter signal $h$ over time as is taught in Astengo U.S. Pat. No. 3,715,718. The rate of change of altitude signal $\dot{h}$ is input to the comparator 212 through the resistor 214 and the capacitor 216. The rate of change of altitude $\dot{h}$ is represented by a DC voltage wherein the greater the rate of change the greater the voltage. The comparator amplifier 212 is set to trigger, in the preferred embodiment of the invention, when the $\dot{h}$ signal indicates a rate of change greater than 25,000 feet per minute. This rate of change is very near the maximum rate of change of most commercial radar altimeters. This very rapid rate of change in altitude readings also represents a very sudden decrease in altitude which would be representative of the type of circumstances illustrated in FIG. 3 and at the same time not likely to represent a case of an aircraft itself approaching the ground. When triggered the comparator amplifier 212 generates a signal on line 218 which in turn is transmitted through the diode 220 to the negative terminal of the bias amplifier 64. The signal on line 218 is of sufficient voltage to suppress any signal output from the biasing amplifier 64 thereby effectively inhibiting the warning system. The feedback loop of the comparator, containing resistor 222, serves to latch the comparator amplifier 212 in a triggered state thereby maintaining the warning system in an inhibited mode. The comparator amplifier 212 also contains two reset inputs, the first of which 224 resets the comparator amplifier 212 into a non-triggered state when the indicated radar altitude is greater than 2500 feet. This corresponds to point 210 of FIG. 3 where the overflight has been completed. Similarly, the reset input 226 will reset the comparator amplifier 212 when the indicated radar altitude is less than 50 feet. Resetting the comparator amplifier 212 at less than 50 feet makes it possible to test the system on the ground and additionally provides for automatic reset when the aircraft is taking off. As indicated before, the system will be inhibited as a whole when the aircraft is in a landing configuration so nuisance warnings will not be generated by resetting at 50 feet during takeoff or landing.

At this point it should also be mentioned that the comparator amplifier 212 will not be triggered for a change of altitude of less than approximately 500 feet. This is a function of the input capacitor 216 which tends to reduce the input voltage of the signal $h$ for a short period. The reason for having an approximately 500 foot change in altitude before the warning system is inhibited, concerns the fact that many objects such as buildings or high cliffs would provide for rapid changes in the indicated altitude readings at lower altitudes where it would be considered undesirable to inhibit the warning system. Therefore, a certain minimum change in altitude is provided in order to compensate for these conditions.

The preferred embodiment of the invention has been described in terms of a circuit that interfaces directly with currently available air data computer specifications and other relevent parameters such as a precise relationship between aircraft speed and minimum safe altitude over terrain. With this in mind, the specification should not be interpreted to restrict the invention to either the environment or the parameters used for illustration but instead should be understood to encompass the broad concepts setforth in this disclosure.

We claim:

1. A ground proximity warning system for aircraft for generating a warning signal when the aircraft is below predetermined altitudes for various speeds of the aircraft comprising:
   means for generating a signal representative of the minimum safe altitude above terrain of the aircraft as a function of the forward speed of the aircraft; and
   means for comparing said minimum safe altitude above the terrain signal with a signal representing the actual altitude above the terrain of the aircraft for generating a warning signal when said actual altitude is above the minimum above the terrain altitude as represented by said minimum safe altitude signal.

2. The warning system of claim 1 additionally including means for inhibiting said warning signal when the rate of altitude change exceeds a predetermined value.

3. The warning system of claim 1 additionally including means for inhibiting said warning signal when the aircraft is in a landing configuration.

4. The warning system of claim 1 wherein said signal generating means includes:
   buffer means responsive to a signal representative of the speed of the aircraft for generating a signal proportional to the speed of the aircraft; and
   bias means responsive to said speed proportional signal for generating a minimum altitude signal.

5. The warning system of claim 4 wherein said bias means includes means for maintaining said minimum altitude signal at a predetermined value for predetermined speeds of the aircraft.

6. The warning system of claim 5 including summing means for biasing said minimum altitude signal by an amount that represents a predetermined minimum warning altitude.

7. The warning system of claim 6 wherein said comparing means is a comparator amplifier that compares said biased minimum altitude signal with said actual altitude signal and generates a warning signal when said biased minimum altitude signal exceeds said actual altitude signal.

8. The warning system of claim 7 additionally including gate means responsive to a signal representing the flight configuration of the aircraft for inhibiting said warning signal when the aircraft is in a landing configuration.

9. The warning system of claim 8 additionally including inhibiting means responsive to a rate of change in altitude signal for inhibiting said warning signal when the rate of change in altitude exceeds a predetermined rate.

10. The warning system of claim 9 wherein said inhibiting means includes additional means to delay the operation of said inhibit means for a predetermined amount of change in said altitude signal.

11. The warning system of claim 10 wherein said actual altitude signal represents the aircraft's altitude above the terrain.

12. The warning system of claim 11 wherein said signal representative of the speed of the aircraft represents the speed of the aircraft in Mach numbers.

13. The warning system of claim 12 including additional means for automatically accepting said signal representing the speed of the aircraft in both an alternating current mode and a direct current mode.

14. The warning system of claim 13 including means for making said system pin-compatible with both the Mark II and the Mark III air data computer specifications.

15. The warning system of claim 1 wherein said generating means increases said minimum safe altitude signal with increasing forward speed of the aircraft.

16. The warning system of claim 15 wherein said generating means limits to a predetermined value said minimum safe altitude signal above a first predetermined forward speed.

17. The warning system of claim 16 wherein said generating means generates a predetermined minimum safe altitude above the ground signal below a predetermined forward speed.

18. The warning system of claim 17 additionally including means for inhibiting said warning signal when the rate of altitude change exceeds a predetermined value.

19. The warning system of claim 18 additionally including means for inhibiting said warning signal when the aircraft is in a landing configuration.

20. A ground proximity warning system mutually compatible with both the Mark II and Mark III air data computer specifications comprising:
   a buffer circuit for receiving from either computer a signal representing the speed of the aircraft;
   a bias circuit including a bias voltage source for receiving the output of said buffer circuit and generating a signal representative of a minimum altitude as a function of the aircraft speed;
   a modification circuit responsive to both computers for automatically modifying the gain and said bias voltage applied to said bias circuit to compensate for the differing inputs of each computer; and
   a comparator circuit responsive to said minimum altitude signal and a signal representing the altitude of the aircraft above the terrain for generating a warning signal when the altitude represented by said minimum altitude signal is greater than the aircraft's altitude above the terrain.

21. The warning system of claim 20 wherein said modification circuit includes:
   a type signal received from the computer indicating the type computer;
   a first transistor, switched on by said type signal from the Mark III computer and responsive to said speed signal from the Mark III computer, for modifying the gain of said bias circuit; and
   a second transistor, switched on by said type signal from the Mark III computer, for modifying said bias voltage supplied to said bias circuit.

22. The warning system of claim 20 additionally including an inhibitor circuit comprising:
   a second comparator circuit, responsive to a signal representing the rate of change in altitude of the aircraft, for generating a signal effective to inhibit the response of said bias circuit to said aircraft speed signal when said rate of change signal exceeds a predetermined level;
   a feedback circuit effective to latch said second comparator circuit into continuously generating said inhibiting signal; and
   a reset circuit for unlatching said second comparator circuit in response to the preferred criteria.

23. The warning system of claim 20 additionally including a logic gate for deactivating said warning signal when the aircraft is in a landing configuration.

24. The warning system of claim 20 wherein said system is pin-compatible with both the Mark II and Mark III type computers.

25. A circuit for use with a ground proximity warning system comprising:
   a buffer amplifier and associated circuitry, responsive to a signal representing the speed of the aircraft for generating a DC signal proportional to the aircraft's speed;
   a bias amplifier and associated circuitry responsive to the output of said buffer amplifier for scaling said DC signal to represent a minimum safe altitude;
   a comparator circuit for comparing said signal representing said minimum altitude with a signal representing the actual altitude and effective to generate a warning signal when said minimum altitude exceeds the actual altitude.

26. The circuit of claim 25 additionally including:
   a second comparator circuit, responsive to a rate signal representing the rate of change in aircraft altitude, for generating an inhibit signal to said bias amplifier in response to a predetermined magnitude of said rate signal;
   a feed-back latch circuit operatively connected to said second comparator circuit for maintaining the output state of said comparator; and
   a reset circuit operatively connected to said second comparator circuit for terminating said inhibit signal.

27. The circuit of claim 25 including:
a bias signal source; and
a summing circuit operatively connected to said bias amplifier output and said bias signal source for adding said bias signal to said minimum altitude signal.

28. A method of generating a warning signal when an aircraft approaches a predetermined altitude from the ground for a given aircraft speed wherein said method comprises the steps of:
   generating, in response to the speed of the aircraft, a signal representation of a minimum safe altitude above the ground for the forward speed of the aircraft;
   comparing said minimum altitude to the aircraft's actual altitude above the ground; and
   generating a warning signal when said minimum altitude is greater than the actual altitude above the ground.

29. The method of claim 28 including the steps of:
measuring the rate of change in altitude; and
inhibiting said warning signal when said rate exceeds a predetermined value.

* * * * *

UNITED STATES PATENT AND TRADEMARK OFFICE
CERTIFICATE OF CORRECTION

PATENT NO. : 3,944,968

DATED : March 16, 1976

INVENTOR(S) : Charles D. Bateman, et al.

It is certified that error appears in the above-identified patent and that said Letters Patent is hereby corrected as shown below:

Column 8, line 2, delete "above" and substitute --below--.

Signed and Sealed this

Fourteenth Day of June, 1988

Attest:

DONALD J. QUIGG

*Attesting Officer*  *Commissioner of Patents and Trademarks*